Patented Apr. 25, 1933

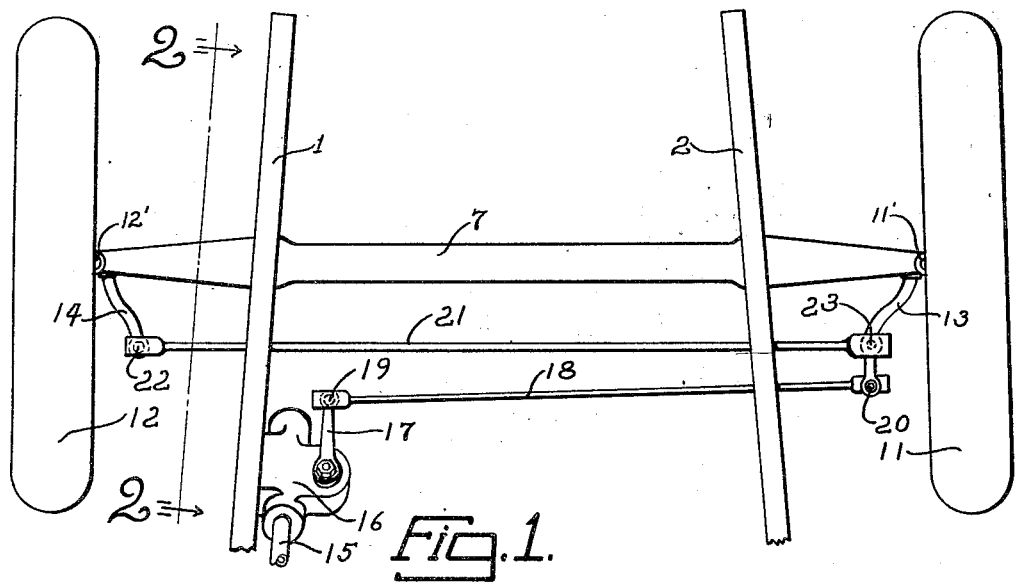
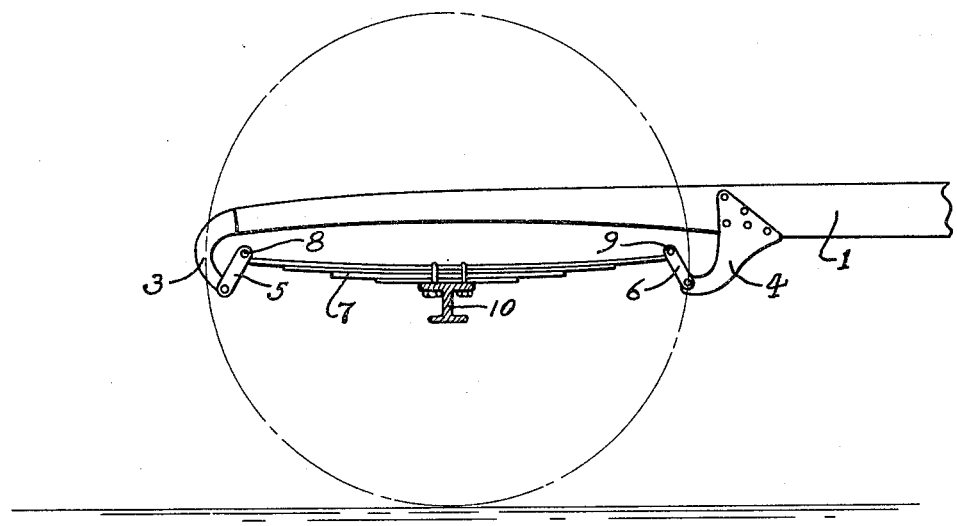

1,905,513

UNITED STATES PATENT OFFICE

EDGAR SHAY, OF PLEASANT RIDGE, MICHIGAN, ASSIGNOR TO CHRYSLER CORPORATION, OF DETROIT, MICHIGAN, A CORPORATION OF DELAWARE

ANTISHIMMYING STRUCTURE FOR VEHICLES

Application filed February 8, 1930. Serial No. 426,970.

The main objects of this invention are to provide an improved steering apparatus and front spring suspension which coact with each other to reduce shimmy; to provide improved structures of this kind which will permit either end of the front axle of a vehicle to shift forwardly and rearwardly relative to the chassis frame and to the other end of the axle without turning the front wheels about their king pins; and to provide a structure of this kind which is adapted to obviate steering wheel fight.

An illustrative embodiment of this invention is shown in the accompanying drawing, in which:

Fig. 1 is a top plan view of the front end of the vehicle chassis embodying my invention.

Fig. 2 is a vertical section taken on line 2—2 of Fig. 1.

In the form shown, the chassis frame comprises a pair of spaced side members 1 and 2 on each of which are mounted a pair of spring suspension brackets 3 and 4. The brackets 3 are formed on the front extremities of the side members and the brackets 4 extend downwardly from the intermediate parts thereof.

Pivotally mounted on the brackets 3 and 4 are shackles 5 and 6 respectively to which springs 7 are pivotally secured at their extremities 8 and 9. A front axle 10 is rigidly attached to the intermediate portions of the springs 7. Wheels 11 and 12 are pivotally mounted on the right and left ends of the axle 7 respectively, by king pins 11' and 12' in a manner which is conventional in motor vehicle construction. The wheels 11 and 12 are provided with steering arms 13 and 14 respectively.

The shackles 5 and 6 by which the springs 7 are suspended from the chassis frame allow the spring and axle to shift forwardly and rearwardly within predetermined limits. This shifting may occur when the wheels 11 and 12 encounter road surface obstructions and irregularities. Either end of the axle may shift in a rearward or forward direction relative to the other and the entire axle is capable of shifting in this manner relative to the frame.

The steering arms 13 and 14 are operatively connected with a steering wheel not shown in the drawing, by which the wheels are controlled. This apparatus comprises a steering tube 15 which extends into a steering gear housing 16 on the member 1 of the left side of the frame. A pitman arm 17 is rotatably supported by the housing 16 and connected by a drag link 18 with the steering arm 13 of the right side of the vehicle. The drag link 18 extends transversely of the chassis and is pivoted at 19 on the extremity of the pitman arm 17 and at 20 on the extremity of the steering arm 13. The steering arms 13 and 14 are connected together by a tie rod 21 which is pivotally attached at 22 to the extremity of the steering arm 14 and at 23 to the intermediate part of the steering arm 13.

In operation, when the right hand wheel 11 of the vehicle encounters road surface irregularities or obstructions, the right end of the axle 10 is shifted somewhat. This movement of the axle does not cause the wheel 11 to be turned about the king pin upon which it is mounted for the drag link 18 and the tie rod 21 are free to pivot about their left ends 19 and 22 respectively.

Shifting of the left end of the axle 7 in a forward or rearward direction causes the tie rod 21 to pivot about its right end 23 without turning either of the wheels about their respective king pins. The free pivotal movement of the drag link 18 and tie rod 21 obviates steering wheel fight which ordinarily is set up when driving over road irregularities. By allowing the axle and wheels to shift forwardly and rearwardly in this manner without turning the wheels about their king pins, shimmy is materially reduced.

Although but one specific embodiment of this invention is herein shown and described, it will be understood that various changes including the size, shape and arrangement of parts may be made without departing from the spirit of my invention and it is not my intention to limit its scope other than by the terms of the appended claims.

I claim:

1. In a vehicle chassis including a frame and a front axle, leaf springs extending longitudinally of said chassis fixed at their intermediate portions to the respectively opposite end portions of said axle for supporting the front end portion of said chassis, a pair of tension shackles each pivotally connected at its lower extremity with said frame and each pivotally attached at its upper end to one of the respectively opposite ends of one of said springs, dirigible wheels pivotally mounted on the ends of said axle having inwardly extending steering arms, a tie rod extending transversely of said chassis and pivotally attached to the ends of said steering arm, a pitman arm on said frame, and a drag link extending laterally of said frame and pivotally connected with said pitman arm and with one of said steering arms.

2. In a vehicle chassis including a frame and a front axle, leaf springs extending longitudinally of said chassis fixed at their intermediate portions to the respectively opposite end portions of said axle for supporting the front end portion of said chassis, a pair of tension shackles each pivotally connected at its lower extremity with said frame and each pivotally attached at its upper end to one of the respectively opposite ends of one of said springs, dirigible wheels pivotally mounted on the ends of said axle each having a steering arm thereon, a tie rod extending transversely of said chassis and pivotally attached to the ends of said steering arm, a pitman arm on said frame, and a drag link extending laterally of said frame and pivotally connected with said pitman arm and with one of said steering arms.

EDGAR SHAY.